United States Patent
Kniepmann et al.

(10) Patent No.: US 9,855,897 B2
(45) Date of Patent: Jan. 2, 2018

(54) VEHICLE MOUNTABLE CARRIER SYSTEM

(71) Applicants: Ken Kniepmann, Tallahassee, FL (US); Brian Will, Quincy, FL (US)

(72) Inventors: Ken Kniepmann, Tallahassee, FL (US); Brian Will, Quincy, FL (US)

( * ) Notice: Subject to any disclaimer, the term of this patent is extended or adjusted under 35 U.S.C. 154(b) by 0 days.

(21) Appl. No.: 14/207,406

(22) Filed: Mar. 12, 2014

(65) Prior Publication Data
US 2014/0263514 A1 Sep. 18, 2014

Related U.S. Application Data

(60) Provisional application No. 61/777,008, filed on Mar. 12, 2013.

(51) Int. Cl.
*B60R 9/02* (2006.01)
*B60R 11/00* (2006.01)

(52) U.S. Cl.
CPC ............... *B60R 11/00* (2013.01); *B60R 9/02* (2013.01); *B60R 2011/004* (2013.01); *B60R 2011/0056* (2013.01); *B60R 2011/0059* (2013.01)

(58) Field of Classification Search
USPC ....... 224/559, 546–547, 553, 560, 564, 543, 224/572, 927; 248/206.2, 220.21, 222.52, 248/224.8, 223.21, 225.21
See application file for complete search history.

(56) References Cited

U.S. PATENT DOCUMENTS

| | | | | | |
|---|---|---|---|---|---|
| 2,157,001 | A | * | 5/1939 | Morley | ..................... B60R 7/10 211/87.01 |
| D128,287 | S | * | 7/1941 | Lauronen | ....................... D6/320 |
| 2,302,300 | A | * | 11/1942 | Davies | .......................... 224/559 |
| 2,488,263 | A | * | 11/1949 | Bishman | ....................... 224/559 |
| 2,500,881 | A | * | 3/1950 | Stader | .................... A47G 25/08 211/100 |
| 2,596,860 | A | * | 5/1952 | McCrory et al. | ............. 224/325 |
| 2,764,331 | A | * | 9/1956 | Bigos | ........................ B60R 9/02 224/546 |
| 3,180,606 | A | * | 4/1965 | Sabin et al. | ................... 248/239 |
| 3,776,437 | A | * | 12/1973 | Carney | ................... B63B 35/85 211/70.5 |
| 3,823,857 | A | * | 7/1974 | Yandt | ......................... 224/42.24 |
| 4,212,445 | A | * | 7/1980 | Hagen | ........................... 248/245 |
| 4,223,862 | A | * | 9/1980 | Doughty | ................. 248/222.52 |
| 4,231,501 | A | * | 11/1980 | Goode | ...................... B60R 9/12 211/70.5 |

(Continued)

*Primary Examiner* — Justin Larson
(74) *Attorney, Agent, or Firm* — Beusse, Wolter, Sanks & Maire, PLLC; Ferdinand M. Romano

(57) ABSTRACT

In one series of embodiments, a carrier system includes a rack mountable on a vehicle to transport material. The rack includes a frame having one or more suction cups attached to the rear side of the frame, e.g., for attachment to a surface such as the side of the vehicle. A support bar mates with the frame. The support bar and the frame may include attachment configurations which mate with one another to selectively and securely attach the bar to the front side of the frame with the bar extending in a direction away from the one or more cups. With the rack comprising a plurality of suction cups, the frame may be configured as a plate or may comprise a series of arms or connected braces which extend away from a center position to the suction cups.

23 Claims, 4 Drawing Sheets

(56) References Cited

U.S. PATENT DOCUMENTS

| | | | | |
|---|---|---|---|---|
| 4,691,851 | A | * | 9/1987 | Aaserude .............. B60R 11/00 224/482 |
| 4,722,465 | A | * | 2/1988 | Brogie ........................ 224/329 |
| 5,344,032 | A | * | 9/1994 | Ramsdell ............ A47B 81/005 211/64 |
| 5,390,837 | A | * | 2/1995 | Ruffolo, Jr. .............. B60R 9/12 224/482 |
| 5,598,956 | A | * | 2/1997 | Schenberg ............ A47G 25/08 223/1 |
| 5,676,284 | A | * | 10/1997 | Schenberg .............. B60R 7/10 223/1 |
| 5,849,390 | A | * | 12/1998 | Dillon ............................ 428/99 |
| 6,032,842 | A | * | 3/2000 | Brickner .................. B60R 9/02 224/546 |
| 6,036,071 | A | * | 3/2000 | Hartmann et al. ............ 224/547 |
| 6,041,717 | A | * | 3/2000 | Kubat .................... B60R 11/06 108/44 |
| 6,412,675 | B1 | * | 7/2002 | Pope ........................ B60R 9/02 224/325 |
| 6,637,707 | B1 | * | 10/2003 | Gates .................. A47B 81/005 211/64 |
| 8,540,198 | B2 | * | 9/2013 | Keyvanloo .............. 248/222.51 |
| 2006/0213942 | A1 | * | 9/2006 | Gomez .................... B60R 9/00 224/532 |
| 2006/0284040 | A1 | * | 12/2006 | Nixon et al. .............. 248/311.2 |
| 2007/0090252 | A1 | * | 4/2007 | Chou .................. A47G 25/065 248/304 |
| 2009/0084915 | A1 | * | 4/2009 | Fukumoto et al. ...... 248/220.21 |

* cited by examiner

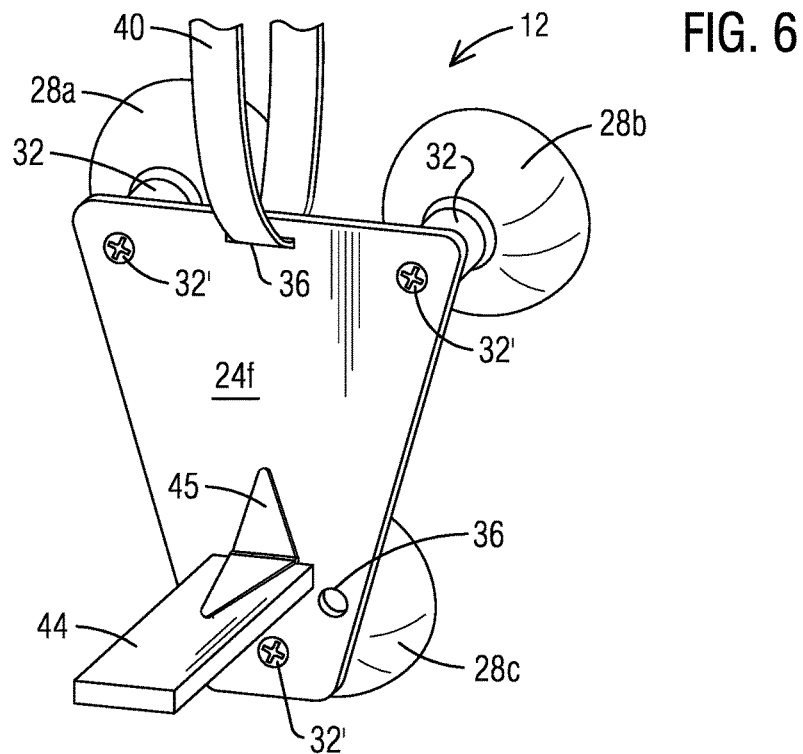
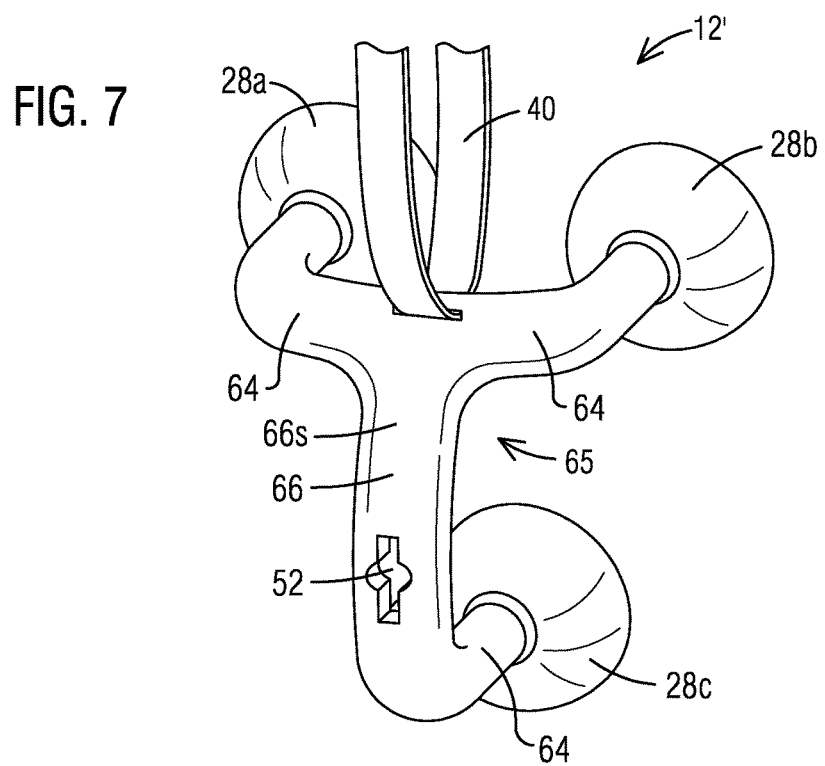

VEHICLE MOUNTABLE CARRIER SYSTEM

RELATED APPLICATIONS

This application claims priority to U.S. Provisional Patent Application Ser. No. 61/777,008, filed Mar. 12, 2013 of which is incorporated herein by reference.

FIELD OF INVENTION

The present invention relates to vehicle mountable rack systems and, more specifically, to removable vehicle mounted rack systems which are easily installed and removed and storable in small vehicle spaces.

BACKGROUND OF THE INVENTION

Conventional rack systems for trucks and other types of vehicles that transport ladders or other long objects are typically top mount systems (e.g., positioned over the roof of the vehicle) or systems attached to the rear of a vehicle (e.g., via a hitch) to carry the load). The difficulties and inconveniences of lifting, securing and transporting long objects like ladders, lengths of wood and pvc piping on an overhead rack system are arise, in part, because it is often necessary to manually raise the objects to roof height and, when employing a rack, there must be a spatial distribution of sufficient attachment points to provide stability to the cargo.

Conventional rack systems for trucks and other types of vehicles that transport ladders or other long objects are typically top mount systems (e.g., positioned over the roof of the vehicle) or systems attached to the rear of a vehicle (e.g., via a hitch) to carry the load). Truck, van, SUV and sedan owners occasionally need to transport lengthy items, but rarely have the capability to do so without securing the item directly to the vehicle, or placing it inside the vehicle itself. Difficulties and inconveniences of lifting, securing and transporting long objects like ladders, lengths of wood and pvc piping on an overhead rack system arise, in part, because it is often necessary to manually lift the objects to roof height. Also, when employing a rack, there must be a spatial distribution of sufficient attachment points to provide stability to the cargo. Typical rack systems, whether aftermarket or factory installed, have narrow cross spans, due in part to relatively short roof lengths. These limit the ability to safely carry many lengthy items. In the case of truck owners, the ability to carry a ladder may require installing overhead rack systems on the truck beds. Ladder racks and other overhead rack systems are expensive, look unattractive, and are relatively permanent. Rack systems may have relatively narrow spans (3-6 feet), in many instances limiting the ability to only carry substantially longer items when the items have internal structural rigidity, e.g., such as ladders. These prior rack systems are not well-suited for carrying long, flexible items, like pvc tubing, crown molding, baseboards, rebar, etc., as these are often sold in 14'-16' lengths. Securing items directly to the vehicle, either without a rack, or by using a narrow span rack, has involved placing the material in contact with the vehicle roof surface. This increases the risk of damaging the automotive paint finish, side mirrors, and other exterior or interior surfaces. Because risks include marring the vehicle interior, the tasks of carrying long flexible materials are often reserved for occasions when the weather is not inclement.

SUMMARY OF THE INVENTION

An exemplary vehicle mountable carrier system is disclosed which is easily deployed to carry long items along the side of a pickup truck, van, SUV, sedan or other vehicle. The system comprises a pair of similar rack assemblies made of aluminum, other metals, high impact plastic, or other sturdy material, and the invention also includes methods for securing the rack to the vehicle. These methods may include use of suction cups or tether straps. The various rack parts may be hinged, riveted, welded, screwed, interlocked, integrally formed or otherwise attached. The carrier system may include two or more racks that each attach to a surface of the vehicle, one rack deployed near a forward-most part of the vehicle, e.g., on or in front of a front-most door; and the other rack deployed near the rear of the vehicle, there being a user adjustable span to fit variable applications.

In one series of embodiments, a carrier system according to the invention includes at least one rack mountable on a vehicle to transport material. The rack includes a frame having front and rear sides. One or more suction cups are attached to the rear side of the frame so that a suction side of each cup faces away from the frame, e.g., for attachment to a surface such as the side of the vehicle. A support bar mates with the frame. In one embodiment, the support bar and the frame include attachment configurations which mate with one another to selectively and securely attach the bar to the front side of the frame with the bar extending in a direction away from the one or more cups. With the rack comprising a plurality of suction cups, the frame may be configured as a plate or may comprise a series of arms or connected braces which extend away from a center position to the suction cups.

The attachment configuration of the frame may include a keyway which extends into or through the frame, e.g., in the form of a slotted opening; and the support bar, also referred to as a rack bar, may include a locking configuration which fits into the keyway to effect securement of the bar at an angle with respect to the frame with the bar extending away from the frame. In one example, the angle may be ninety degrees, but smaller angles are contemplated. More generally, the carrier system may comprise a plurality of racks according to any of multiple embodiments.

Each rack may comprise three spaced-apart suction cups. Each suction cup may be connected to the frame via a tubular post or other stand-off positioned between the frame and the back side of the suction cup, i.e., the opposite the suction side. The afore-mentioned locking configuration may include on the frame a rectangular-like slot extending into or through the frame. The slot may include a circular portion within which a portion of the bar can rotate to place the bar in a secure, locked position or in a position from which the bar can be removed from the frame slot. On the rack bar, the locking configuration may be formed about a first end of the bar and a stop may be formed along an upper surface about a second end of the bar.

While carrier systems according to the invention may be deployed on either side of a vehicle, it is intended for deployment to be only on the passenger side of the vehicle. A carrier system may typically comprise at least two similar racks that each mount on any smooth metal or glass surface of the vehicle. In the disclosed embodiments each rack is a single unit comprising 3 main components: 1) a base plate, 2) one or more suction cups, and 3) a horizontal rack bar.

BRIEF DESCRIPTION OF THE DRAWINGS

FIG. 6 illustrates components of the carrier system according to an alternate embodiment which employs a hinge.

FIG. 7 is a front view of a rack which, according to another embodiment, comprises a frame formed of brackets in lieu of a flat plate.

Like reference numbers are used throughout the figures to denote like components. Numerous components are illustrated schematically, it being understood that various details, connections and components of an apparent nature may not be shown in order to emphasize features of the invention. Various features shown in the figures may not be shown to scale in order to emphasize features of the invention.

DETAILED DESCRIPTION OF THE INVENTION

Before describing in detail exemplary methods, systems and components according to embodiments of the invention, it is noted that the present invention resides primarily in a novel and non-obvious combination of components and method steps. So as to not obscure the disclosure with details that will be readily apparent to those skilled in the art, certain conventional components and steps have been omitted or presented with lesser detail, while the drawings and the specification describe in greater detail elements and steps pertinent to understanding and practicing the invention. Further, the following embodiments do not define limits as to structure or method according to the invention, but provide examples which include features that are permissive rather than mandatory and illustrative rather than exhaustive.

Figure 1:
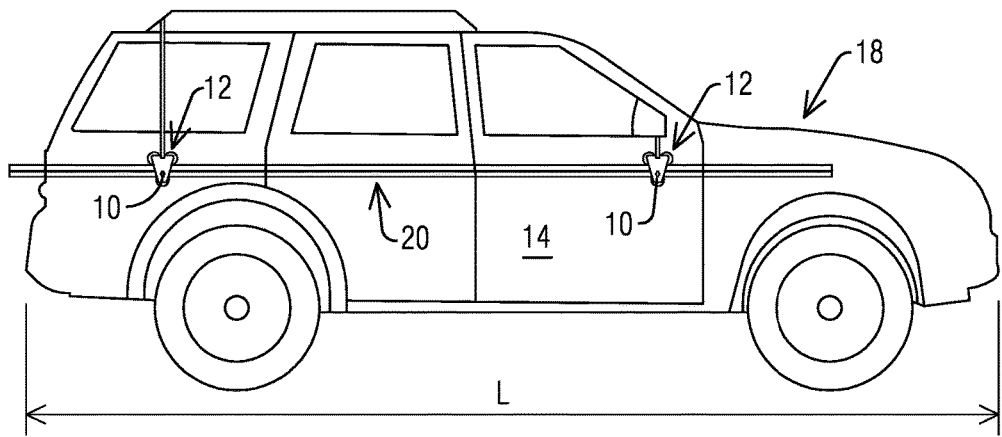
FIG. 1 is a perspective view of a side a vehicle on which a carrier system according to the invention is installed.

With reference to FIG. 1 there is shown a carrier system 10 according to an embodiment of the invention. The system 10 comprises one or more hangers, referred to herein as racks 12. Each rack 12 is shown mounted along a common side 14 of a vehicle 18. The vehicle is shown positioned above a horizontal ground plane, G with two mounted racks to enable transporting lengths of material 20. The material may span a portion of, all of or more than the length, L, of the vehicle 18. The material 20 may be any of a variety of items, including items typically used in home projects, light construction, and sporting activities (e.g., pipes, molding or other types of wood or plastic trim, wood studs, rods, fishing gear, etc.). Generally, the system is suitable for transporting items which are relatively long and narrow, but is not so limited in versatility. Further, the racks can also be mounted on other surfaces of the vehicle, including the rear side, the front side, the roof and the hood, although mounting on the vehicle side 14 may be preferred in most applications.

As illustrated in this description, embodiments of the invention are portable, compact, and easy to transport and deploy. System components can be stored in a vehicle when not in use. Additionally, loading material on the carrier system and unloading the material can be relatively quick and simple. For example, the material or other cargo can be attached to and carried by the vehicle at approximately the waist or chest level of a typical person. This is to be contrasted with placement of the material 20 over the roof line of a vehicle, as is common with many carriers. Further, the system can be deployed with sufficient distance between a pair of the racks 12 to support the ends of long flexible materials like pvc pipe, baseboards, crown molding, etc., which are often sold in 10',12' and 16' lengths. Still further, the system can be used to carry long lengths of materials alongside the vehicle without allowing the material to touch and potentially damage the surface of the vehicle side 14. Moreover, the system can be mounted on the vehicle 18 by one person in less than a few minutes.

Figure 2A:
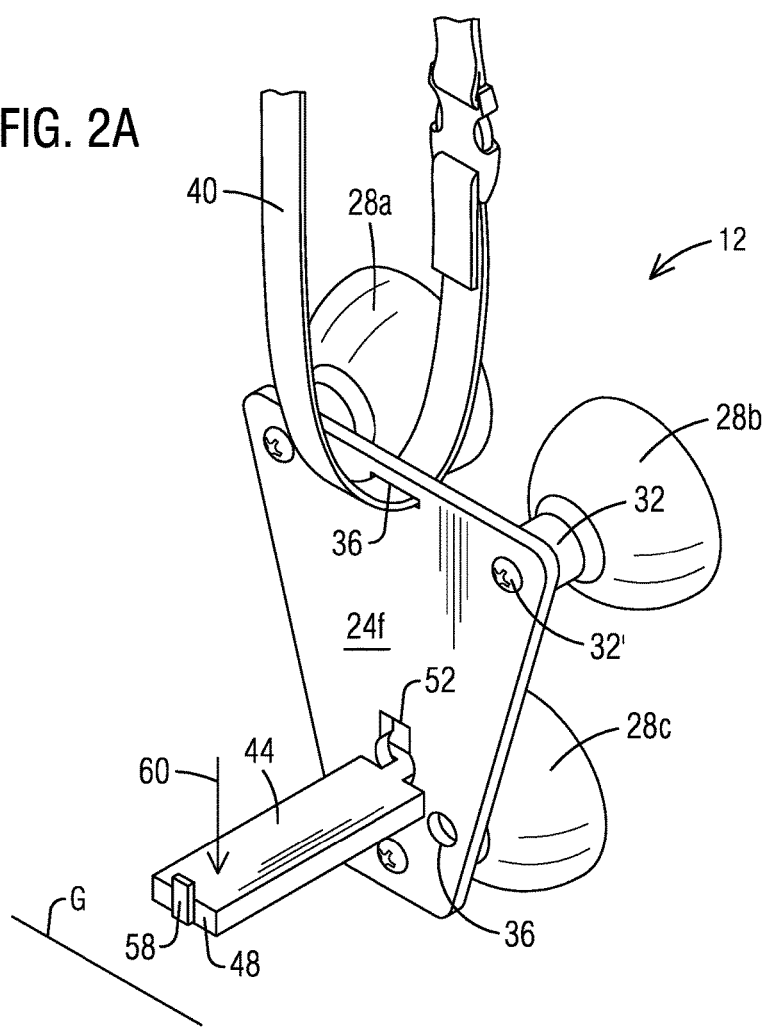
FIG. 2A is a perspective view illustrating the front side of a rack or hanger shown in FIG. 1.
Figure 2B:
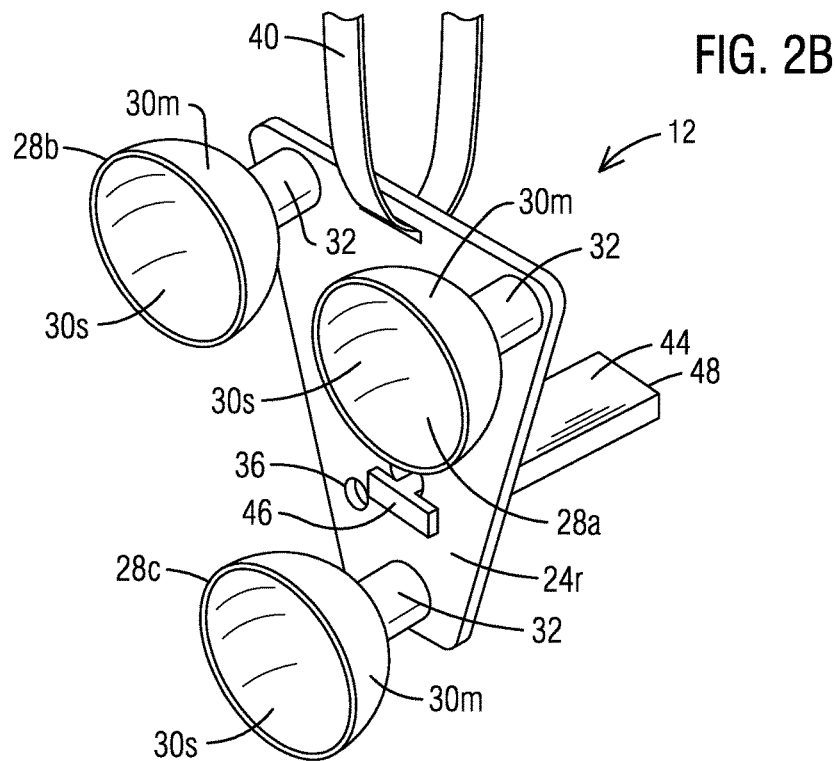
FIG. 2B is a perspective view illustrating the rear side of a rack or hanger shown in FIG. 1.
Figure 3:
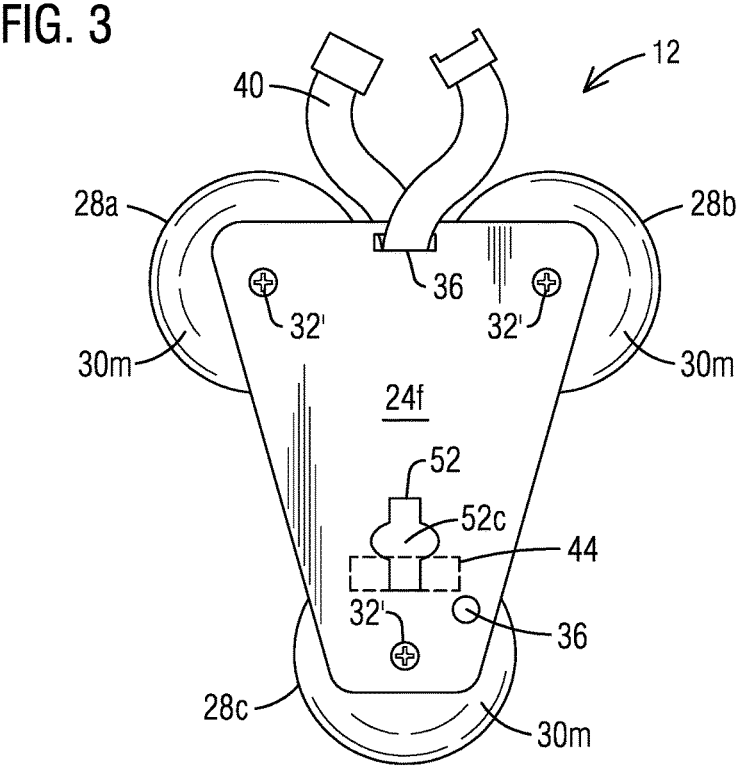
FIG. 3 is a front view of the rack shown in FIG. 2.

FIGS. 2A and 2B are front and rear perspective views of a rack 12 as would be deployed when mounted on the vehicle side 14. FIG. 3 provides a front elevation view of the rack 12. As can be seen in the figures, the illustrated embodiment of the rack comprises a plate 24 having a front side 24f shown in FIGS. 2A and 3, and a rear side 24r, shown in FIG. 2B, to which three suction cups 28a, 28b and 28c are mounted in a spaced-apart triangular-like configuration. The suction cups may be made of rubber or other pliant material (e.g., a plastic). The cups 28a and 28b are positioned along a horizontal line and above the cup 28c relative to the ground plane, G. Each cup includes first and second opposing sides 30s and 30m. The side 30s is an open suction side which faces away from the plate 24 for contact with a surface to which the cup is to be attached. The side 30m is a rear side which faces the plate for attachment thereto through a stand-off 32 in the form of a tubular shaped mounting post.

Figure 4:
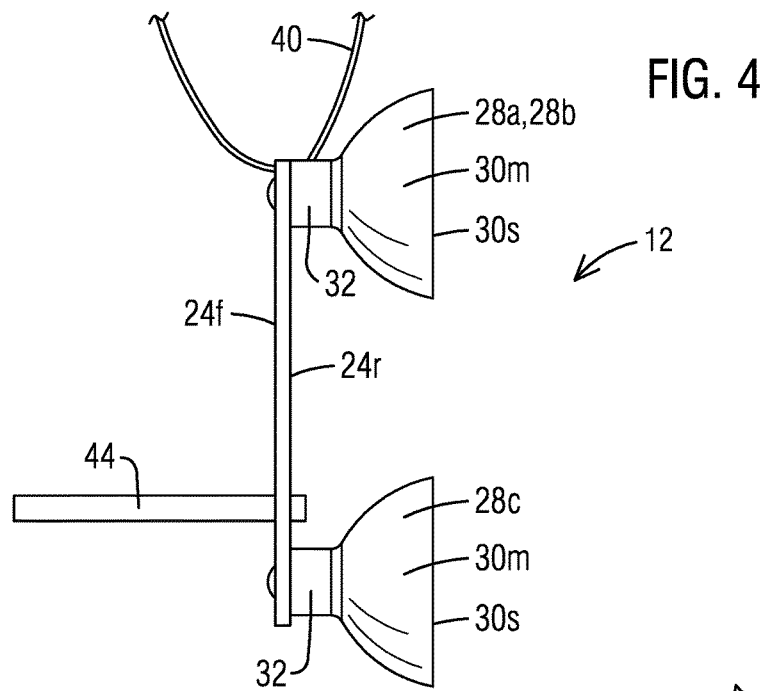
FIG. 4 provides a side elevation view of the rack shown in FIG. 2.
Figure 5:
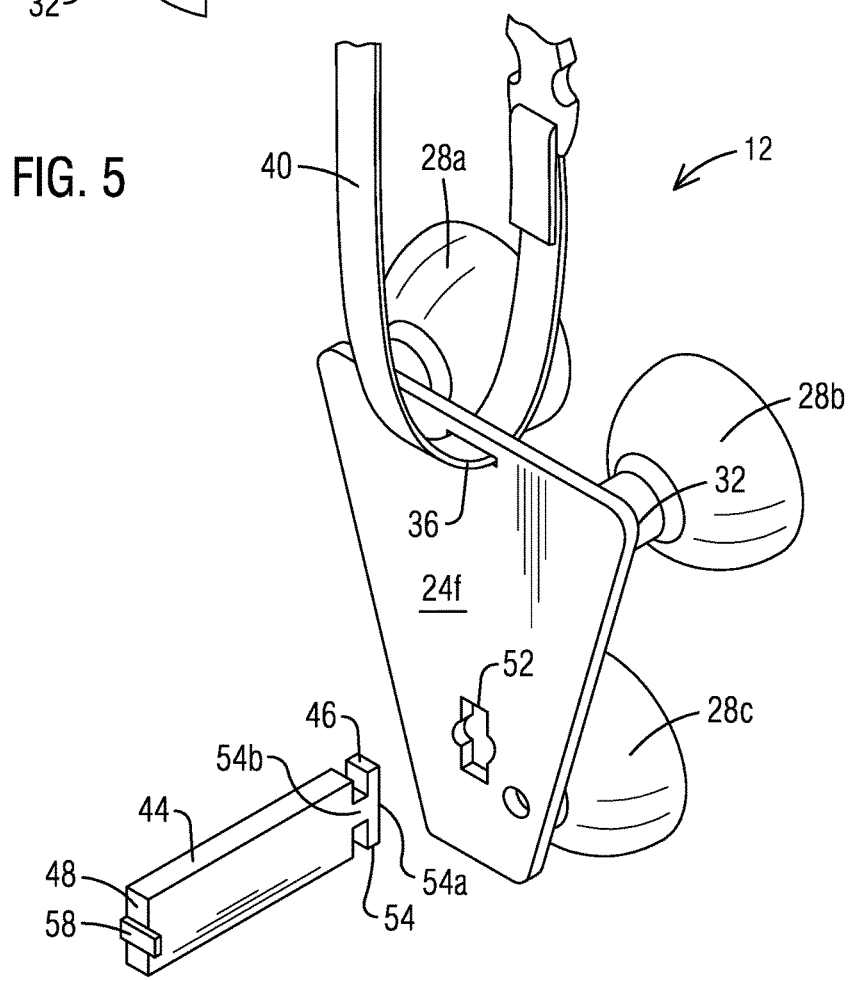
FIG. 5 illustrates components of the rack shown in FIGS. 2-4 in spaced apart relation prior to assembly.

FIG. 4 provides a side elevation view of the rack 12 taken along an edge of the plate 24 to illustrate the stand-offs 32 which space the cups 28a, 28b and 28c away from the plate 24. Each suction cup 28a, 28b and 28c is connected to the rear side 24r of the plate with a conventional fastener that extends from a point of securement within the cup and into or through the plate 24. For example, to secure each cup to the plate 24, a machine screw 32' may pass through an aperture in the plate, through a stand-off 32 and into the rear side 30m of a cup where it is threaded into a nut (not shown) that is secured within the cup.

The plate 24 may be a flat plate of arbitrary shape and of sufficient height relative to the ground plane and sufficient width, in a direction parallel to the ground plane, to accommodate an array of suction cups which provide both vertical and horizontal stability to the mounted rack 12. Although three cups are illustrated, the number of suction cups attached to each plate 24 is a design choice which depends, in part, on the load to be carried and conditions such as the vehicle speed during transport and the stability of attachment for each cup.

The base plate may be made of aluminum, other metal, plastic or another sturdy material. Additionally, the plate 24 may have holes or slots which serve as attachment points for anchor ends of, for example, bungee cords or other means of securing loads to each rack 12. Appropriate dimensions for the plate 24 are approximately 7 inches in height by 5½ inches in maximum width. The plate thickness may be on the order of ¼ inch.

The illustrated stand-offs 32, in the form of hollow, cylindrically shaped posts, each extend away from the rear side 24r of the plate to provide necessary clearance from the vehicle body, e.g., to avoid interference due to contours in the shape of the vehicle side 14. In other embodiments he stand-offs 32 may be attached to the plate 24 by weld joints, other types of fasteners, or may be integrally formed with the plate 24 (e.g., with injection molding manufacture to create plastic or composites shapes). Nominal dimensions of cylindrically shaped posts which serve as stand-offs are one inch in diameter and one inch in length.

The plate 24 may also include one or more additional holes or slots 36 which each serve as an additional attachment point for a tether 40 that provides securement to the vehicle in addition to the suction cups. Each tether may be a conventional strap of suitable width, length and strength, may be constructed of nylon or other flexible synthetic or natural material commonly described as webbing/strapping. A tether 40 may comprise a buckle system for tightening and securing the tether to a mounting point on the vehicle. In this regard, a tether may be threaded through or around any attachment point on the vehicle (e.g. OEM attachment rings in a pickup truck bed or a roof rack on an SUV). Exemplary tether dimensions are 0.75 inch in width, and varied length, e.g., two to six feet.

The suction cups 28a, 28b and 28c may be any of a variety of suction cup or vacuum cup designs which readily adhere to the vehicle side 14 or a vehicle window. The suction cups may be of commercial grade to assure provision of sufficient suction to remain stably attached to the vehicle side under specified load conditions. Suitable suction cup dimensions are approximately 3 inches in diameter along the open suction side 30s and 1.5 inches in height.

A rack bar 44 extends from the plate 24 in a direction away from the suction cups to provide a support to carry and secure the material 20. In the embodiment illustrated in FIGS. 2 through 6, the rack bar 44 is easily attachable to and detachable from the plate 24 when deploying the system 10. It can be readily removed from the plate 24 to improve compactness of the system for storage purposes. In another embodiment shown in FIG. 6, a rack bar 44' and the plate 24 form a foldable assembly where the bar 44' may be attached to the plate 24 with a hinge 45 so it can swing away from the plate to support the load of the material 20 when the system is deployed (e.g., to extend in a direction which is ninety degrees away from the plane in which the front side 24f of the flat plate 24 resides). The hinge 45 includes a stop (not shown) which may be an angle bracket positioned along a bottom surface of the rack bar at the first end 46. The stop limits the range of the angle to which the hinge opens to provide a desired angle between the rack bar 44' and the plate 24. The hinged bar 44' can also be swung about the hinge angle to rest against the plate when the carrier system is being stored. Although not illustrated, for these and other embodiments, when the carrier system is deployed, the rack bar may extend to less than a ninety degree angle relative to the plate 24, i.e., to provide a modest vertical incline of the rack bar relative to the plate. This can impart a beneficial positive slope to the rack bar, as a function of distance along a direction away from the plate. In still other embodiments, the rack bar may be permanently affixed to the plate 24 with no freedom to rotate or change the angle of the bar 44 relative to the plate 24.

For the embodiment illustrated in FIGS. 3 and 4, the rack bar 44 and the plate 24 are shown in a deployed configuration of the system 10 where the plate is in a vertical position and the rack bar is approximately in a horizontal position with respect to the ground plane. The rack bar 44 is of a generally rectangular shape, having a nominal height (i.e., shown in a vertical direction with respect to the ground plane) of about 1¼ inches, a width (i.e., along a horizontal direction) of about ½ inch and a length, measured between first and second opposing ends 46, 48, of 5½ inches. The rack bar includes features formed about the first and second opposing ends 46, 48. See FIG. 5. To effect selectable securement of the rack bar 44 to the plate, the plate 24 includes a keyway 52 sized to accept a mating feature 54 formed about the first end 46 of the rack bar 44. The exemplary keyway 52 is a combination of a rectangular shaped slot, which extends through the plate 24, and a circular cutout 52c which widens a center region of the slot to permit rotation of the mating feature 54 when placed in the keyway 52. The opening provided by the keyway 52 extends a sufficient length and width in the vertical and horizontal directions to receive the nominal dimensions of the rack bar end 46.

In the illustrated embodiment the mating feature 54 includes keyway cutouts 56 which leave a rectangular segment 54a at the end 46 suitable for insertion through the keyway. As shown in the figures, the segment 54a may be the full nominal height and width of the rack bar. The keyway cutouts 56 leave a small, recessed rectangular segment 54b in the center region of the rack bar, i.e., which does not extend the full height of the rack bar. The small segment 54b connects the segment 54a to the rest of the rack bar 44. When the rectangular segment 54a at the end 46 is inserted through the keyway 52, the smaller rectangular segment 54b, having nominal height and width dimensions of ½ inch, resides in the slot. The diameter of the circular cutout 52c, enables rotation of the rack bar when the larger rectangular segment 45a is extended through the keyway to the rear side 24r of the plate. For example, the cutout 52a may have a ¾ inch diameter. Once the rack bar is rotated into a desired rotational position, it is slid downward in the keyway to secure the rack bar in a lower rectangular portion of the keyway slot, i.e., below the circular cutout.

A second feature of the rack bar 44 is provision of a stop 58 at the second end 48, along an upper surface 60 thereof. The stop impedes movement of the material off the end 48 when being placed on the surface 60. The combination of the stop 58 and any slope provided to the rack bar also help keep the material in place during transport. To impart a slope to the installed rack bar, relative to the plate 44, the mating feature may be formed at an angle with respect to the vertical orientation of sides of the cutout.

The rack bar 44 may be made of aluminum, other metal, a plastic or a composite material. Further, the rack bar may have holes in the bottom or sides to provide anchor points for rope, straps, bungee cords or other means to secure the load to the rack. An exemplary rack bar is 5½ inches long, ½ inch thick and 1¼ inches wide.

According to still another embodiment, FIG. 7 is a front view of a rack 12' which, in lieu of a frame formed in the shape of the flat plate 24, comprises an assembly 65 of interconnected brackets or arms 64 which extend in different directions from a center position 66, with each of three suction cups 28a, 28b and 28c connected to an arm 64. The brackets or arms 64 may be formed of injection molded plastic. The center position 66 includes a surface 66s along which the keyway 52 or other mating feature may be formed or positioned to interface with a mating feature of the rack bar.

While this written description and the drawings enable one of ordinary skill to make and use what is believed to be the best mode for practicing the invention, those of ordinary skill will understand and appreciate the existence of variations, combinations, and equivalents of the disclosed embodiments, methods, and examples described herein. For example, a carrier system may utilize an integrated unit of cup, post and plate fabricated in an injection molding or machining process. The integrated unit may comprise vacuum cups of the type which apply suction via a lever on the cup. An advantage of using vacuum cups is that these types of cups are more capable of lifting heavy objects like glass or pulling dents. Such cups may be produced as part of an integrated assembly to make a "handle-type" device, and are manufactured by companies such as Tooluxe. In such a design, one or more vacuum cups would be designed into a fully integrated unit where the cups, post and plate are formed together. The invention is therefore not limited by the described embodiments, but only by the scope and spirit of the claims which now follow.

The claimed invention is:

1. A carrier system for transporting a load of material by mounting the material along an exterior surface of a vehicle to support the load on one or more support bars, the carrier system including a first rack to support a portion of the load, the first rack comprising:
- a plate for mounting on a side of the vehicle to support the portion of the load along the vehicle side and above a ground plane, the plate, when mounted on the vehicle, having front and rear sides each having a flat major surface extending along a flat plane, an upper plate portion and a lower plate portion for receiving support from the side of the vehicle through one or more suction cups, with
  - (i) the upper plate portion including a first hole for receiving tether material there through to tether the plate from a portion of the vehicle above the plate with the tether material, and
  - (ii) an attachment point along the front side from which one of the support bars can extend away from the plate for holding the portion of the load on the plate; and
  - (iii) the lower plate portion including a second hole positioned at or below the level of the attachment point relative to the ground plane and extending through the plate;
- one or more suction cups attached to the rear side of the plate to carry the load along the side of the vehicle so that a suction side of each of the one or more cups faces away from the plate for attachment to the exterior surface, each cup connected against the plate through an intermediate stand-off to carry the load, each stand-off positioned between the plate and a side of a suction cup opposite the suction side wherein, when support tether material is passed through the first hole and the vehicle, the plate is tethered from above with the tether material, the portion of the load carried by the first rack can be entirely supported only by the one or more suction cups; and
- a first support bar having first and second opposing ends, the first end being an attachment end insertable through the flat major surface of the front side of the plate and through the flat major surface of the rear side of the plate to effect securement of the support bar connected to the plate about the attachment point of the plate to thereby attach the bar to the front side of the plate with the bar extending in a direction away from the plate and away from the one or more suction cups, the first support bar having a shape providing a flat surface which adjoins the plate when supporting the load, the attachment end positionable against the front side of the plate with the second end extending in a direction away from the plate so that when the first rack is mounted on a side of the vehicle to carry the load on the flat bar surface above the ground plane, the first cup is positioned below the support bar and the load can be mounted directly against the plate for carrying on the flat support bar surface and above the support bar at least as high above the ground plane as the plate without any limitation or interference due to the shape of the support bar.

2. The system of claim 1 wherein the first rack comprises three spaced-apart suction cups each connected to the plate via a stand-off positioned between the plate and a side of a suction cup opposite the suction side.

3. The system of claim 1 further comprising:
- a support bar, the bar and the plate each having a hinge attachment configuration which rotatably attaches the bar to the plate to selectively and securely position the bar to the front side of the plate with the bar extending in a direction away from the one or more cups at a predetermined angle.

4. The system of claim 1 wherein the hole extending through the plate to pass a tether through the plate is shaped to receive a tether in the form of a strap.

5. The system of claim 1 further including a tether for securing the plate by passing the tether through the plate and attaching the tether to a mounting point on the vehicle.

6. The system of claim 1 wherein the attachment configuration of the first rack connects the bar to the plate at an angle of ninety degrees with respect to the plate.

7. The carrier system of claim 1 wherein the attachment point from which one of the support bars can extend away from the plate, for holding the portion of the load, is positioned between the first hole and the first cup.

8. The carrier system of claim 1 further including a fastener for each suction cup, wherein each suction cup and associated stand-off are attached to the plate with the fastener extending into the plate, through the stand-off and into the side of the suction cup opposite the suction side.

9. The system of claim 1 wherein (i) the plate of the first rack includes a keyway, formed about the attachment point, which extends through the front side and through the rear side of the plate and (ii) the first support bar includes a locking configuration which fits into the keyway to effect securement of the bar at an angle with respect to the plate with the bar extending away from the plate.

10. The system of claim 9 wherein the locking configuration includes a rectangular-like slot extending into the plate, the slot including a circular portion within which a portion of the bar can rotate to place the bar in a secure, locked position or in a position from which the bar can be removed from the plate slot.

11. The system of claim 10 wherein the locking configuration is formed about a first end of the bar and a stop is formed about a second end of the bar.

12. A carrier system for transporting a load of material by mounting the material along an exterior surface of a vehicle to support the load, the carrier system including a first rack comprising:
- a plate having front and rear sides each having a flat major surface extending along a flat plane;
- at least a first suction cup, each suction cup having a suction side which is a front side of the cup and a rear side, the one or more suction cups operative to carry the load when the plate is mounted on a side of the vehicle;
- a stand-off interposed between the rear side of the plate and the rear side of the first suction cup to attach the first suction cup in spaced apart relation to the plate, wherein the stand-off is attached between the rear side of the plate and the rear side of said one suction cup with (i) the rear side of the first suction cup facing the plate and (ii) the front side of the first suction cup facing away from the plate for attachment to the exterior surface; and
- a first support bar having first and second opposing ends and a shape providing a flat surface portion on which to secure the load in contact therewith, the first end insertable through the flat major surface of the front side of the plate and through the flat major surface of the rear side of the plate to effect securement of the support bar with the flat surface portion of the support bar adjoining the plate when supporting the load on the flat surface portion, with the second end extending in a direction away from the plate so that when the first rack is mounted on a side of the vehicle to carry the load on the flat surface portion above a ground plane, the first cup is positioned below the support bar and a portion of the load can be mounted directly over and in contact with the flat surface portion of the first support bar with said same portion of the load coming into contact with the plate when carrying said same portion of the load above the flat surface portion of the support bar at least as high above the ground plane as the plate without any limitation or interference due to the shape of the first support bar.

13. The system of claim 12 wherein, for the first rack, the frame is attached to said one suction cup with a fastener which passes through the stand-off and into the rear side of said one cup where it is secured, and the stand-off is a discrete, cylindrically shaped post attached to the frame to extend away from the rear side of the plate to provide necessary clearance from an exterior surface on the side of the vehicle.

14. The system of claim 12 wherein, for the first rack, the stand-off spaces the rear side of the frame and the rear side of said one suction cup from one another by at least one inch.

15. The system of claim 12 further including a second rack comprising:
   a plate having front and rear sides;
   at least a second suction cup, each suction cup having a suction side which is a front side of the cup and a rear side, the second suction cup operative to carry the load when the plate is mounted on a side of the vehicle; and
   a second support bar having first and second opposing ends, the first bar end positionable against configured for attachment along the front side of the frame with the second bar end extending in a direction away from the frame so that when the second rack is mounted on a side of the vehicle to carry the load above the ground plane, the second cup is positioned below the support bar.

16. The system of claim 12, the first rack further including a stop configured for attachment near the second end of the first support bar to extend above the bar so that, with the stop attached to the second end of the first support bar, with the first rack mounted on the side of the vehicle to carry the load above the ground plane and the first support bar positioned to extend in a direction away from the plate, the stop impedes movement of the material of the load placed thereon in a direction away from the plate and off the second end of the first support bar.

17. The system of claim 12 wherein the first rack comprises:
   at least three suction cups mounted in a triangular-like spaced-apart configuration wherein, when the first rack is mounted on a side of the vehicle to carry the load above the ground plane, two of the cups are positioned along a horizontal line above the support bar and parallel to the ground plane, while the first cup is positioned below the support bar, each suction cup having a suction side which is a front side of the cup and a rear side; and
   a stand-off attached to each suction cup to position each suction cup in spaced apart relation to the plate, wherein each stand-off is attached between the rear side of the plate and the rear side of one suction cup with (i) the rear side of each suction cup facing the plate and (ii) the front side of each suction cup facing away from the plate for attachment to the exterior surface.

18. The carrier system of claim 12 further including a fastener for each suction cup, wherein the first suction cup and the stand-off interposed between the plate and the suction cup are attached to the plate with the fastener extending into the plate, through the stand-off and into the rear side of the first suction cup.

19. A carrier system for transporting a load of material by mounting the material along an exterior surface of a vehicle to support the load, the carrier system including a first rack comprising:
   a plate having front and rear sides each having a flat major surface extending along a flat plane
   at least one suction cup connected to the plate with a fastener, each suction cup having a suction side which is a front side of the cup and a rear side;
   a support bar having first and second opposing ends, the first bar end configured for attachment about an attachment point along the front side of the plate with the second bar end extending in a direction away from the plate, the first bar end being insertable through the flat major surface of the front side of the plate and through the flat major surface of the rear side of the plate to effect attachment thereto,
   wherein a surface portion of the support bar extending between the first and second bar ends is positioned to come into direct contact with a portion of a load positioned directly over said surface portion of the support bar,
   wherein, when the plate is mounted on a side of the vehicle and carries said same portion of the load above a ground plane and in direct contact with said surface portion of the support bar, the first cup is positioned below the support bar,
   wherein the plate includes a hole positioned at or below the attachment point relative to the ground plane and extending through the plate, and
   wherein the support bar first end is positionable against the front side of the plate with the second support bar end extending in a direction away from the plate and when said same portion of the load is mounted directly over and in contact with said surface portion of the support bar, none of the support bar interferes with placement of any of said same portion of the load, that is positioned directly over said surface portion of the support bar, directly against and in contact with the plate while carrying said same portion of the load directly above said surface portion of the support bar at least as high above the ground plane as the plate extends above the ground plane without any limitation or interference due to the shape of the support bar.

20. The system of claim 19 wherein:
   the hole positioned at or below the attachment point is separate and distinct from any hole through which the fastener connects the at least one suction cup to the plate,
   the plate extends above the bar to come into contact with material of the load placed on the bar, and
   the plate directly impedes movement of material of the load placed on the bar from moving to said at least one suction cup.

21. The system of claim 19 further including a second rack comprising:

a second plate having front and rear sides;

at least one suction cup, each suction cup of the second rack having a suction side which is a front side of the cup and a rear side; and a second support bar having first and second opposing ends, the first bar end configured for attachment along the front side of the frame with the second bar end extending in a direction away from the frame, wherein the second plate includes a hole positioned at or below the attachment point relative to the ground plane and extending through the plate.

22. The system of claim 19 wherein said surface portion of the support bar includes a flat surface and the first end of the support bar is insertable through the plate to effect securement of the support bar with the flat surface adjoining the plate when supporting said same portion of the load on said surface portion, the system further including;

a stop configured for attachment near the second bar end to extend above the bar so that, when the bar is positioned to extend in a direction away from the plate, the stop impedes movement of the material of the load placed on the bar from moving in a direction away from the plate and off the second bar end.

23. The carrier system of claim 19 further including a stand-off interposed between the rear side of the plate and the rear side of the first suction cup to attach the first suction cup in spaced apart relation to the plate, wherein the fastener attaches the stand-off between the rear side of the plate and the rear side of said one suction cup with (i) the rear side of the first suction cup facing the plate and (ii) the front side of the first suction cup facing away from the plate for attachment to the exterior surface, and with the fastener extending into the plate, through the stand-off and into the rear side of the first suction cup.

* * * * *